(12) United States Patent
Ochs et al.

(10) Patent No.: US 7,760,269 B2
(45) Date of Patent: Jul. 20, 2010

(54) METHOD AND APPARATUS FOR SIZING AN IMAGE ON A DISPLAY

(75) Inventors: David H. Ochs, Corvallis, OR (US); Frederick Denham Taft, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 11/209,245

(22) Filed: Aug. 22, 2005

(65) Prior Publication Data

US 2007/0052851 A1 Mar. 8, 2007

(51) Int. Cl.
*H04N 5/46* (2006.01)
*H04N 5/50* (2006.01)

(52) U.S. Cl. ........................ 348/556; 348/569

(58) Field of Classification Search ................ 348/556, 348/445, 581, 564, 569, 333.05, 333.11, 348/333.12; 386/52, 83, 123, 124; 345/660, 345/667–671; 715/764, 788, 800, 801; 725/38
See application file for complete search history.

(56) References Cited

U.S. PATENT DOCUMENTS

| | | | |
|---|---|---|---|
| 5,061,958 A * | 10/1991 | Bunker et al. ................. 399/81 |
| 5,767,834 A * | 6/1998 | Vouri et al. ................. 345/698 |
| 6,141,003 A | 10/2000 | Chor | |
| 6,175,362 B1 | 1/2001 | Harms | |
| 6,188,399 B1 | 2/2001 | Voas | |
| 6,252,590 B1 * | 6/2001 | Sawai et al. ................. 345/667 |
| 6,324,554 B1 * | 11/2001 | Watanabe et al. ........... 715/235 |
| 6,366,263 B1 * | 4/2002 | Takasu et al. ................. 345/13 |
| 6,441,854 B2 * | 8/2002 | Fellegara et al. ....... 348/333.13 |
| 6,750,890 B1 * | 6/2004 | Sugimoto ................... 715/838 |
| 7,158,175 B2 * | 1/2007 | Belz et al. ................. 348/231.3 |
| 7,542,050 B2 * | 6/2009 | Kramer et al. ............. 345/629 |
| 2002/0015064 A1 * | 2/2002 | Robotham et al. ........... 345/863 |
| 2003/0009768 A1 * | 1/2003 | Moir ........................... 725/112 |
| 2003/0080977 A1 * | 5/2003 | Scott et al. .................... 345/629 |
| 2003/0210281 A1 * | 11/2003 | Ellis et al. .................... 345/838 |
| 2004/0051784 A1 * | 3/2004 | Ejima et al. ............. 348/207.99 |
| 2004/0201767 A1 * | 10/2004 | Niikawa et al. ........ 348/333.03 |
| 2004/0227911 A1 | 11/2004 | Salvatori | |
| 2004/0239686 A1 * | 12/2004 | Koyama et al. ............. 345/620 |
| 2004/0252238 A1 | 12/2004 | Park | |
| 2005/0002000 A1 | 1/2005 | Salvatori et al. | |
| 2005/0041159 A1 * | 2/2005 | Nakamura et al. .......... 348/722 |
| 2005/0184972 A1 * | 8/2005 | Tashiro et al. ................ 345/173 |
| 2005/0243209 A1 * | 11/2005 | Iwahashi ..................... 348/556 |
| 2006/0072028 A1 * | 4/2006 | Hong ..................... 348/333.01 |

OTHER PUBLICATIONS

AOC 7F-SLK 17 inch, User's Manual; by Envision Peripherals; www.aocmonitor.com; v2-123102; p. 9.

* cited by examiner

*Primary Examiner*—Victor Kostak (57) ABSTRACT

Methods and apparatuses are provided for sizing an image on a display screen. A user is provided the ability to display an image, display graphical objects, navigate, highlight, and activate one of the graphical objects on a display screen thereby sizing the image to the display screen.

33 Claims, 8 Drawing Sheets

METHOD AND APPARATUS FOR SIZING AN IMAGE ON A DISPLAY

BACKGROUND

Video Cassette, Television, Digital Versatile Disk (DVD), and Satellite video sources come in several formats with different aspect ratios. The conventional 4:3 aspect ratio format is proposed to be replaced with a 16:9 aspect ratio format for High Definition Television (HDTV). Movies on DVD may be formatted in 'wide screen', also known as 'letterbox', which is yet another aspect ratio.

With the abundance of contemporary signal and data formats for images, there is a need to properly and easily configure the size of images to match display screens. Users typically have a single display device having one fixed aspect ratio, and although projector systems allow for variable aspect ratio outputs, the user typically has a single screen with a fixed aspect ratio. It is difficult for the user to configure a video signal having one aspect ratio to a display device with a different aspect ratio. Several past approaches for helping users properly configure the video signal to the display device have frustrated the user, and in some cases have caused the user to return their newly purchased display device. The requirement to properly match an image to a display is a common problem. For example, improper matching occurs when the user of a 16:9 aspect ratio HDTV attempts to display an incoming signal of a standard TV broadcast having a 4:3 aspect ratio. The first number in the aspect ratio refers to the relative horizontal length of the displayed image, while the second number represents the relative vertical height of the image. In this case, the 4:3 aspect ratio signal cannot be sized to directly fit the 16:9 aspect ratio display since the aspect ratios are not exactly matched.

Figure 1:
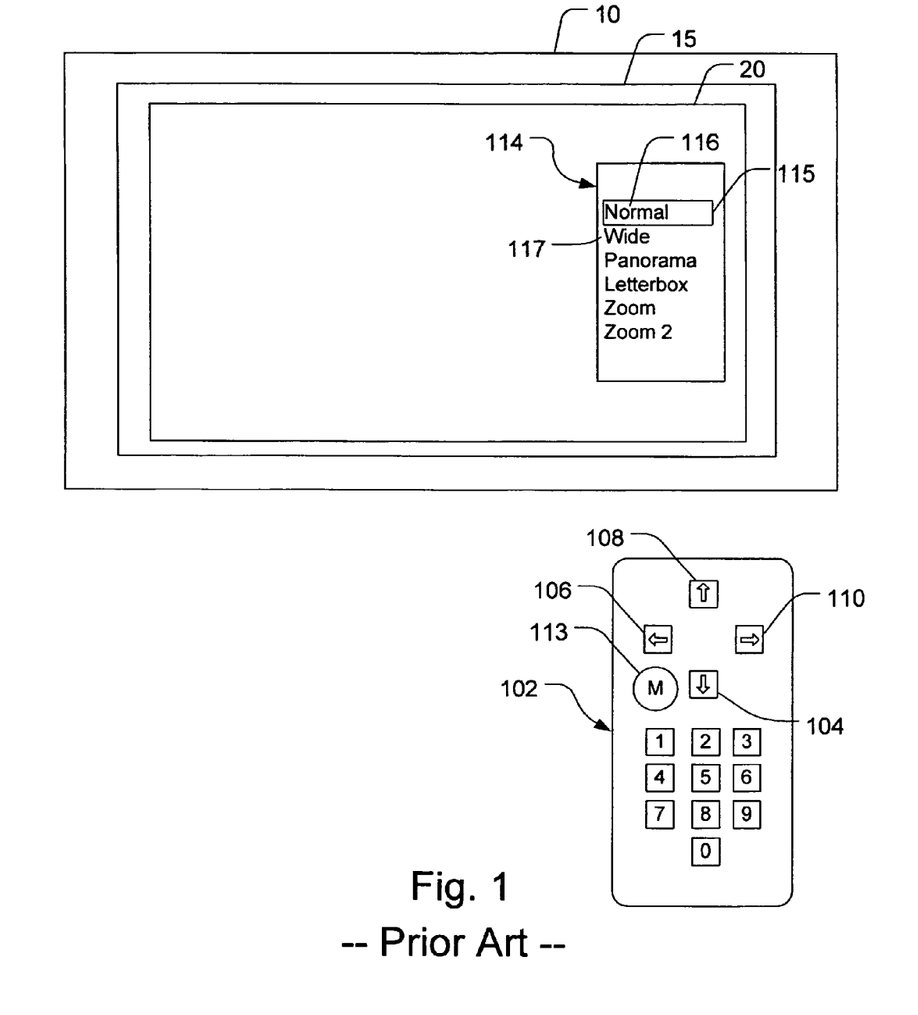
FIG. 1 is an illustrated diagram of a display using a pop-up menu to present a text list of display options assisting the user in choosing the appropriate aspect ratio for formatting an image signal to a display.

A typical approach for helping users properly configure a video signal to the display device is shown in FIG. 1 for example using the Hewlett-Packard VP 6320 projector. FIG. 1 shows a display 10 comprising a screen 15 displaying an image 20, where a display processor can accept commands from a remote control 102. The remote control 102 has directional control buttons, 104, 106, 108, and 110, and a menu (M) button 113. Generally, there are many other buttons on the remote control 102; for example, to adjust volume, select the channel, etc., but these have been omitted for clarity. When the menu (M) button 113 on the remote control 102 is pressed, a pop-up window 114 appears on the screen 15, typically within the image 20 on the display 10. In this example, the pop-up window 114 displays six text choices for sizing the image 20 to the screen 15. The directional control buttons, 104, 106, 108, and 110 on the remote control 102 are used to navigate through these text choices. The text describes to the user how the image 20 will be sized to the screen 15. When the text choices are navigated, one of the choices is highlighted 115, and the image 20 is automatically sized to the screen 15. Typically, these text words are cryptic or not very useful. For example, in this case, the 'Normal' 116 option is highlighted. 'Normal' does not resize or reprocess the image signal to specifically fit the aspect ratio of the image 20 to the screen 15.screen. If another choice, for example, such as 'wide' 117 were highlighted, the image would automatically be sized in a 'wide' format. If yet another choice were highlighted by navigation, the image 20 would automatically be resized based on that choice. Clearly, the text description of 'Normal' 116 offers little insight to the user as to how the image 20 will be sized to the display 10. The text description 'wide' 117 hints that the picture may be somewhat wider in the horizontal direction than the vertical, but not how much, and likewise, the other text choices are marginally helpful. As a result, many users do not attempt to properly size the image to the display; rather the users just accept the displayed image with the potential of being dissatisfied and frustrated with the result. A more determined user may choose to experiment with the display options by cycling through the options several times, memorizing the effects along the way, attempting to gain insight and possibly coming upon an acceptably sized image 20 in the process.

If an intuitive user interface to properly configure a video signal to a display device is not developed, widespread acceptance of new display devices, such as High Definition Televisions, will be hindered or delayed.

BRIEF DESCRIPTION OF THE DRAWINGS

The invention is better understood with reference to the following drawings. The elements of the drawings are not necessarily to scale relative to each other; rather, emphasis has instead been placed upon clearly illustrating the invention. Furthermore, like reference numerals designate corresponding similar parts through the several views.

DETAILED DESCRIPTION

This invention is directed to electronically formatting an image signal with a predictive graphical object based user interface, thereby properly fitting an image to a display screen in accordance to user preference.

Figure 2:
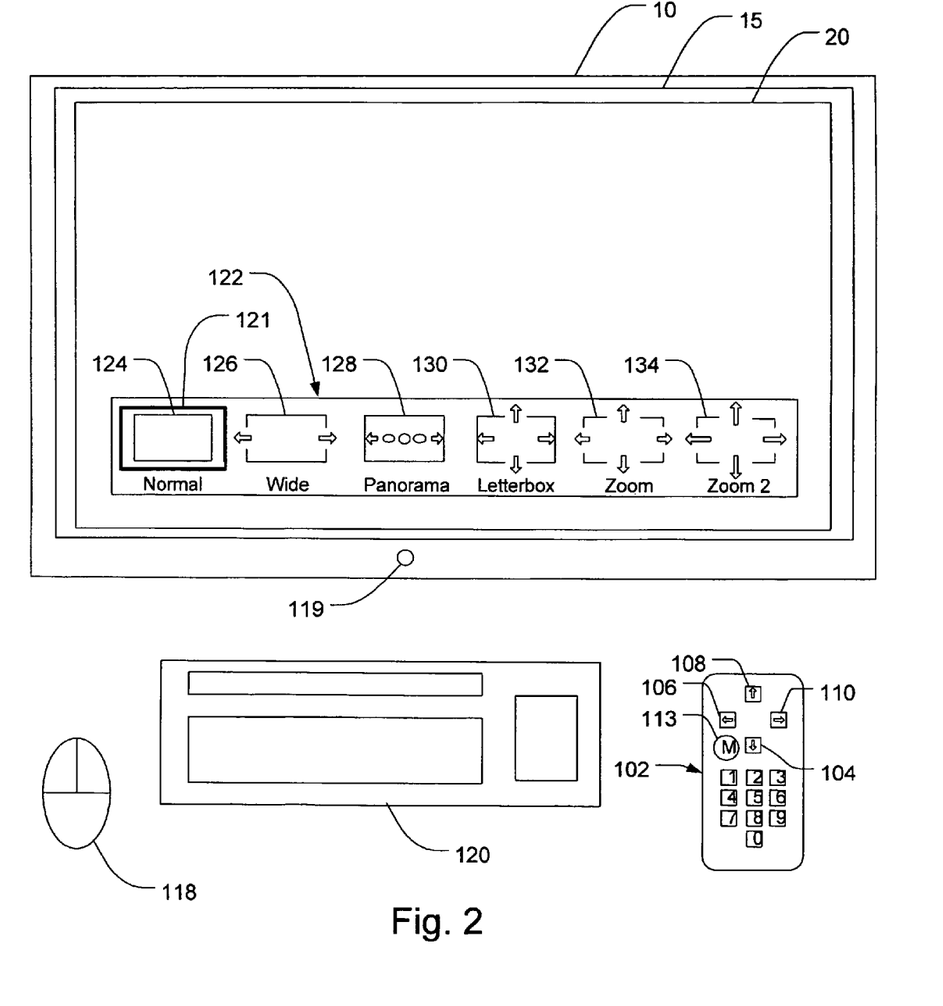
FIG. 2 is an exemplary diagram illustrating a display system according to one embodiment of this invention.

FIG. 2 shows a display and input devices according to one embodiment of this invention. The display 10 includes a screen 15 upon which an image 20 is displayed or in the case of video, a series of images. However, if the aspect ratio of the image 20 is improperly sized to the screen 15, part of the displayed image 20 will be lost if the image 20 overfills the screen 15, or resolution may be lost if the image 20 does not completely fill the screen 15. When an image overfills the screen 15, the image signal is processed to stretch or size the image in excess of the length or width of the screen 15 on the display 10. To optimally size the image 20 to the screen 15, the user chooses options in the form of graphical objects 124, 126, 128, 130, 132, and 134, which may be placed in a $1^{st}$ object area 122 on the screen 15. Displaying an object area on the screen 15 is not a requirement, since the graphical objects 124, 126, 128, 130, 132, and 134 may reside directly on the screen 15. Input devices such as a keyboard 120, a mouse 118, and one or more switches 119 on the display 10 can be used to bring up graphical objects 124, 126, 128, 130, 132 and 134 which represent sizing options for the image 15 from which the user may choose. However for exemplary purposes, only a remote control input device 102 will be described, although there are many other possible input devices that could be used to choose the display screen sizing options, but they are not listed or shown. On the remote control input device 102, buttons 104, 106, 108 and 110 are used to navigate and highlight only one of the graphical objects 124, 126, 128, 130, 132 or 134. In this case, the navigation and highlighting are accomplished by pressing button 106 to move the highlight box 121 to the left and pressing button 110 to move the highlight box 121 to the right. In this example, the graphical object 124 titled 'normal' is bounded by the presence of box 121 around the graphical object 124 indicating the graphical object 124 has been highlighted. Once highlighted, the image signal is automatically sized to the screen 15 in accordance with the parameters of the highlighted object. Since only one graphical box at a time is highlighted, the other graphical objects 126, 128, 130, and 132, and 134 are not highlighted, but as previously described, could be highlighted using the navigation buttons 106 and 110 on the remote control input device 102. The box 121 which functions to highlight the graphical object 124 is also a graphical object, and therefore, is not limited in shape to being a box, but can take another shape, such as an arrow, or have a variety of other shapes, features, colors, textures, transparencies etc. The non-textual graphical object 124, itself may be animated, textured, colored, semitransparent etc.

Returning to the case where the graphical object 124 titled 'normal' is highlighted by a box 121, an image signal is sized to the screen 15 automatically and in real time in direct accordance with the parameters associated with the highlighted graphical object 124, which in this case is 'normal'. The 'normal' graphical object 124 takes the shape of a rectangle and emulates the shape and aspect ratio of the image 20 on the screen 15 thereby giving the user an indication that the image and the screen will match. The 'normal' mode does not resize or reprocess the image signal to specifically fit the screen. Fitting the image signal to the screen 15 is described in detail in reference to FIGS. 4, 5, 6 and 7. In a fashion similar to highlighting the 'normal' graphical object 124, graphical objects 126, 128, 130, 132, and 134 can each be individually highlighted, and once highlighted, the image 20 is automatically sized to the screen 15 by electronically processing the image signal to stretch the image signal uniformly across the image in the horizontal direction for 'wide' as indicated in 126, stretch the image signal non-uniformly across the image in the horizontal direction for 'panorama' as indicated in 128, overstretch the image signal in the vertical direction for 'letterbox' as indicated in 130, expand (or magnify) the image signal in all directions for 'zoom' as indicated in 132, or further expand (or magnify) the image signal in all directions for 'zoom 2' as indicated in 134. These modes will be described in detail in reference to FIGS. 4, 5, 6, and 7.

Highlighting a graphical object with the subsequent automatic processing to re-size the image is called auto-activation. When the user navigates the displayed graphical objects, the processor immediately starts processing the image signal based on the particular graphical object selected. Another form of activation (manual activation) is when the user navigates the graphical objects, but the processor does not process the image signal until a confirmation from the user is issued, typically from a button on a remote control device.

Figure 3:
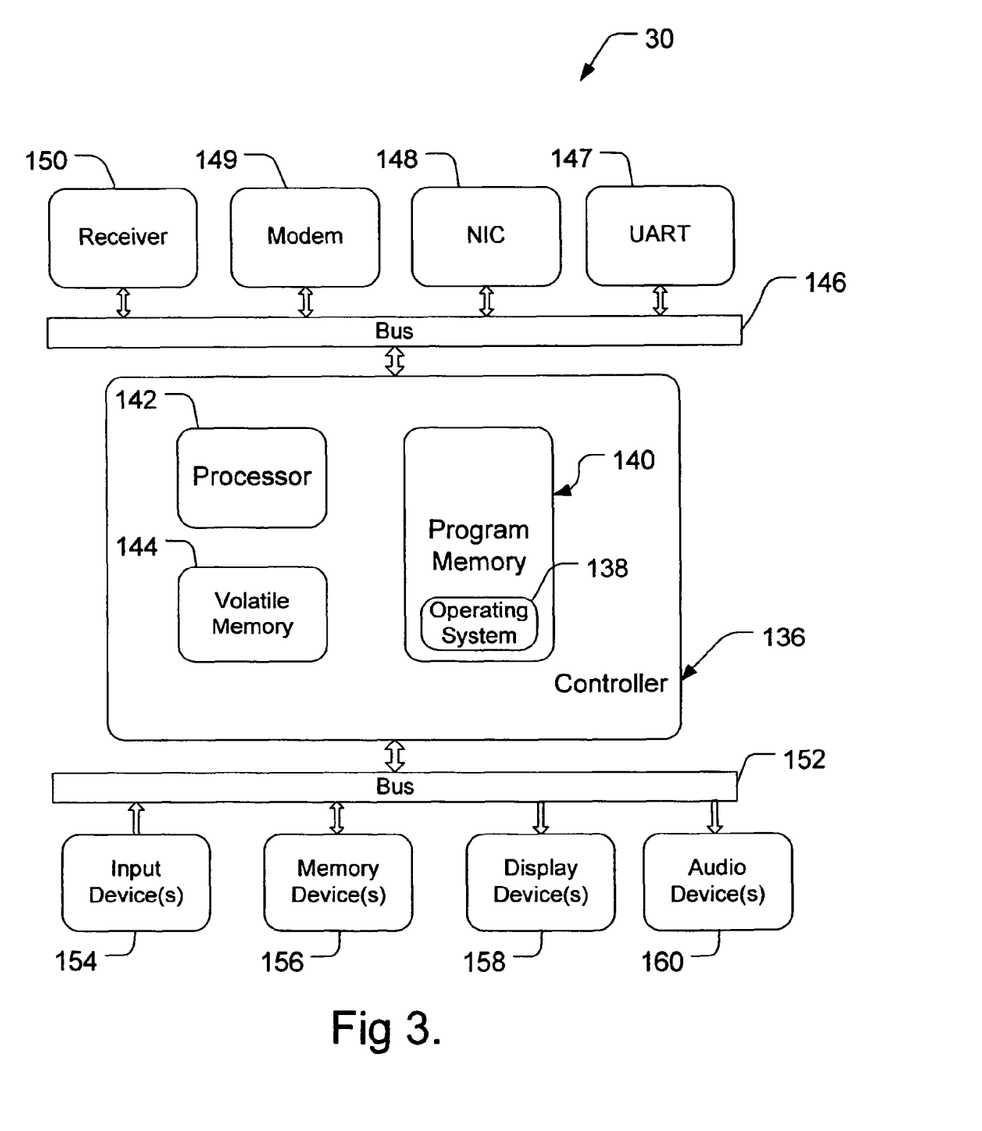
FIG. 3 is an exemplary block diagram of a display sub system according to one embodiment of this invention.

FIG. 3 shows a display subsystem 30 according to one embodiment of this invention, wherein the image signals to be displayed, for example, are received by a receiver 150, a modem 149, a NIC (Network Interface Card) 148, or a UART (Universal Asynchronous Receiver-Transmitter) 147. Received signals from receiver 150 may be in the form of modulated video transmissions from, for instance, local television stations, satellites, cable providers, etc. The modem 149 typically receives modulated digital signals from, for example, telephone quality analog cable sources or video cable sources (cable modems). The NIC 148 and UART 147 typically receive digital signals from high speed digital cable sources. If the received signals are not already in the correct digitized form, the signals are digitally converted and transferred to a bus 146 where a controller 136 reads and processes the signals from the bus 146 using a processor 142 and volatile memory 144, under instructions provided by the program memory 140 and operating system 138, thereby providing signals to the display device or devices 158 connected through a bus 152. Although buses 146 and 152 are shown separately, they can be the same, or may comprise individual buses dedicated for example to each receiver 150, modem 149, NIC 148, UART 147, display device 158, input device 154, memory device 156, audio device 160, or any combination of separately or connected busses.

The controller 136 accepts inputs from an input device 154 through a bus 152. Examples of input devices are a mouse 118, a button 119 on the display 10, a keyboard 120, and a remote control 102, etc. all shown in FIG. 2. The controller 136 accepts inputs from the input device 154, processes inputs with a processor 142, and sends commands to the display device 158 to display graphical objects 121, 122, 124, 126, 128, 130 132, and 134 on the screen 15 as shown in FIG. 2. The input device 154 interacts with the user and the controller 136 to navigate and thereby highlight a graphical object 124, 126, 128, 130, 132, or 134 on the screen in FIG. 2. The highlighted graphical object signals the controller 136 to process the image signal to re-size the image 20 to the screen 15 as shown in FIG. 2. Other devices may share a bus 152 on the display subsystem 20 such as one or more audio devices 160 to use with a soundtrack, memory devices 156 such as for example, internal or external solid state memory tape or disk drives by which to record and play image content etc.

Figure 4:
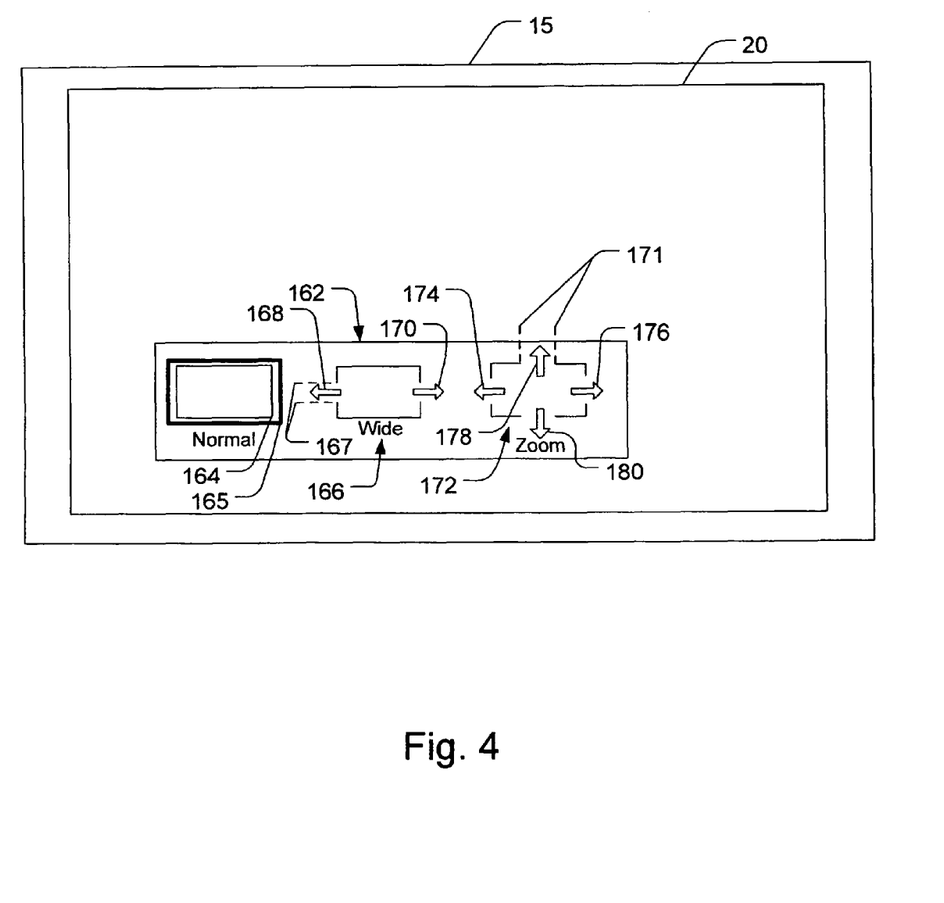
FIG. 4 is an exemplary view of a display screen showing icons assisting the user in properly configuring an image signal to the display when the display has an aspect ratio of 16:9 and the incoming image signal is formatted with an aspect ratio of 16:9 according to one embodiment of this invention.

FIG. 4 shows a 16:9 aspect ratio screen 15 according to an embodiment of this invention when the incoming image signal is in 16:9 format. FIG. 4 displays a different menu than FIG. 2 because FIG. 2 is typically what the user would see when displaying a 4:3 image signal format on a 16:9 aspect ratio screen 15 as further discussed in reference to FIG. 5. When the menu (M) button 113 on the remote control 102 in FIG. 2 is pressed, a 2nd object display area 162 may be displayed, and icons 164, 166, and 172 appear in the 2nd object display area 162. Since the $2^{nd}$ object display area 162 is rendered as an object, it may take on properties of an object such as color, transparency, shape, animation etc. Each of the icons 164, 166, and 172 are graphically designed and rendered on the screen 15 to help the user understand how the image 20 will be sized to the screen 15 when highlighted by navigation. These icons 164, 166, & 172 represent 'normal', 'wide', and 'zoom' modes respectively. Only these image sizing options are displayed when the menu (M) button 113 on the remote control 102 in FIG. 2 is pressed since the controller 136 in FIG. 3 detects, identifies and decodes the incoming image signal as a signal formatted with a 16:9 aspect ratio.

The navigation buttons 106 and 110 in FIG. 2 allow the user to position a box 165 around one of the icons 164, 166, and 172. Pressing navigation button 106 moves the box 165 left and pressing navigation button 110 moves the box right. The box 165 around an icon 164, 166, or 172 represents it has been highlighted. In this example, the 'normal' icon 164 is highlighted by the box 165 and the controller 136 in FIG. 3 automatically processes the image signal according to the highlighted icon 164. Icon 164 is termed 'normal', meaning that no resizing of the image signal is required since the aspect ratio of icon 164 matches the aspect ratio of the screen 20 and hence, the image signal is processed so that the image fills the screen 15. In this 'normal' situation, the content of the incoming image signal is already formatted in a 16:9 aspect ratio while the display screen 15 also has a 16:9 aspect ratio. Therefore the aspect ratio of the image 20 is well matched to the screen 15 and no special processing of the image 20 is required by the controller 136 of FIG. 3. The shape of the rectangular icon 164 termed 'normal' has specifically been designed to indicate to the user that when icon 164 is highlighted a 16:9 image signal will be displayed as an image 20 completely filling the 16:9 aspect ratio of the screen 15. Therefore, the rectangular icon 164 is a predictive indicator illustrating to the user how the image 20 will fit the screen 15 even before the icon is highlighted.

In a similar predictive manner, icon 166 includes arrows 168 and 170 showing the user how the image signal will be processed to fit the screen 15 before the icon 166 is highlighted. The left arrow 168 and the right arrow 170 indicate to the user that the image signal will only be stretched horizontally, not vertically, as shown by the left arrow 168 and the right arrow 170 extending through the gap 167 past the broken border of rectangular icon 166. The broken boarder represents the border of the screen 15. When the image signal is processed, the leftmost and rightmost portions of the image 20 will overfill the screen 15 border and therefore, not be displayed. Therefore, if icon 166 is highlighted by using the navigation buttons 106 or 110 on remote control 102 in FIG. 2, the image 20 overfills the left and right sides of the screen 15 as shown by arrows 168 and 170. This display sizing mode is called 'wide'.

In yet another predictive manner, icon 172 includes arrows 174, 176, 178, and 180 showing the user how the image signal will be processed to fit the image 20 to the screen 15 before the icon 172 is activated. The substantially equal length of the arrows 174, 176, 178, and 180 indicate to the user that the image will be stretched similarly in both the horizontal and vertical directions thereby accomplishing a zoom-in function. The arrows 174, 176, 178, and 180 extend through the gap 171 past the broken border of the rectangular icon 172. The broken boarder represents the border of the screen 15. The arrows 174, 176, 178, and 180 indicate to the user that when the image signal is processed, some of the outer portions of the image 20 will overfill the screen 15 border and therefore, not be displayed. This display sizing mode is called 'zoom'.

The icons 164, 166, 172, the $2^{nd}$ object image area 162, and the highlight box 165 disappears from the image 20 after a short period of user inactivity so as not to detract from the users view of the image 20, or they can be removed, for example, by pressing the menu (M) button 113 on remote control 102 in FIG. 2 a second time. One having ordinary skill in the art of creating user interfaces may create other buttons on a variety of input devices to accomplish the function of removing the icons 164, 166, 172, 162, and 165. For instance, this removal function could be implemented on alternate input devices such as a mouse 118, keyboard 120, or the button 119 on the display 10 as shown in FIG. 2.

Figure 5:
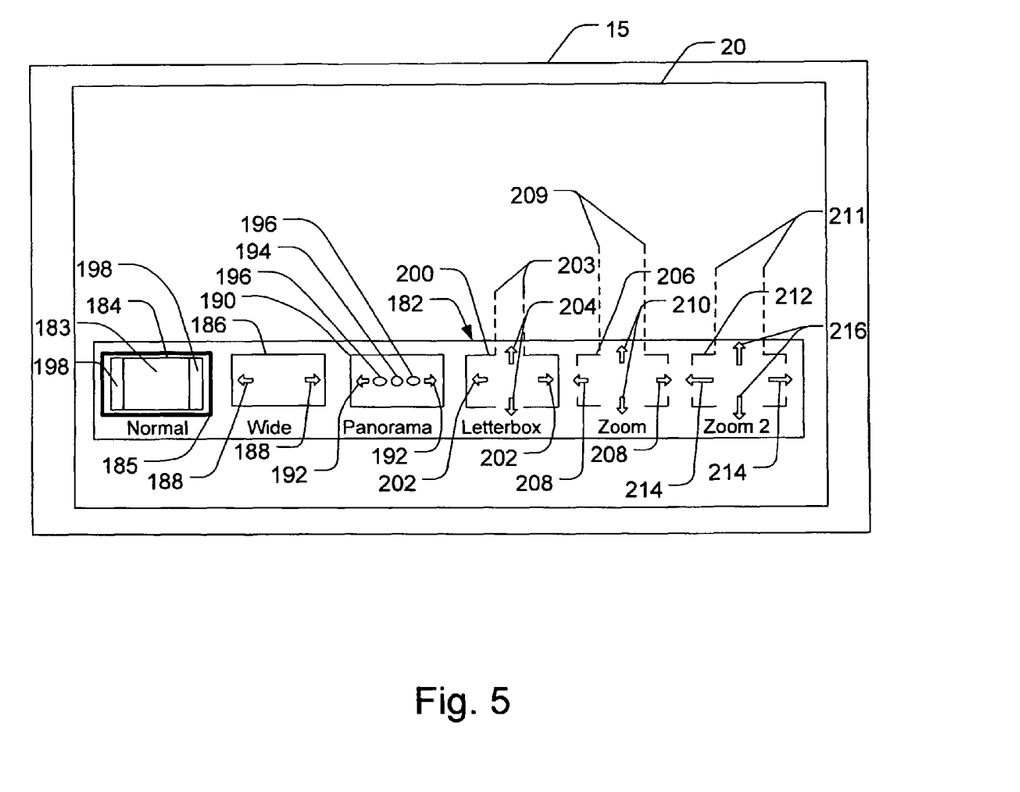
FIG. 5 is an exemplary view of a display screen showing icons assisting the user in properly configuring an image signal to the display when the display has an aspect ratio of 16:9 and the incoming image signal is formatted with an aspect ratio of 4:3 according to one embodiment of this invention.

FIG. 5 shows a 16:9 aspect ratio screen 15 according to an embodiment of the invention when 4:3 formatted image signal is displayed on a 16:9 aspect ratio screen 15. Displaying a 16:9 formatted image signal on a 16:9 aspect ratio screen 15 is discussed in reference to FIG. 4. When the menu (M) button 113 on the remote control 102 in FIG. 2 is pressed, icons 184, 186, 190, 200, 206, and 212 appear in an $3^{rd}$ object display area 182. Since the $3^{rd}$ object display area 182 is rendered as an object, it may take on properties of an object such as color, transparency, shape, animation etc. Each of the icons 184, 186, 190, 200, 206, and 212 are graphically designed to help the user understand and predict how the image will be sized to the display if activated and represent 'normal', 'wide', 'panorama', 'letterbox', 'zoom', and 'zoom 2' modes respectively. Only these sizing options are displayed because the controller 136 in FIG. 3 detects, identifies, and decodes the incoming image signal and determines that the image signal is formatted with a 4:3 aspect ratio. Therefore only the display options relevant to sizing of the 4:3 signal to the 16:9 display are presented.

The navigation buttons 106 and 110 in FIG. 2 allow the user to position a box 185 around one of the icons 184, 186, 190, 200, 206, and 212, by moving the box 185 left and right. The box 185 surrounding an icon represents it has been highlighted. For example, in this case the 'normal' icon 184 is highlighted and the controller 136 in FIG. 3 automatically processes the image signal according to the activated icon 184, which in this case is 'normal'. 'Normal' refers to no resizing of the image. However, in this situation, unlike the situation in FIG. 4 where 'normal' refers to fitting a 16:9 image signal to a 16:9 display, the content of the incoming image signal has a 4:3 aspect ratio even though the display screen 15 has a 16:9 aspect ratio. Therefore, the image 20 is not directly matched to the screen 15, and the 'normal' mode, as represented by icon 184, indicates to the user that the 4:3 aspect ratio image 183 resides completely within the 16:9 aspect ratio formed by the perimeter of icon 184 and therefore excludes the areas 198 where no image is displayed.

Icon 186 includes arrows 188 indicating to the user how the image signal will automatically be processed and displayed when icon 186 is highlighted. The arrows 188 indicate to the user that the image signal will only be stretched horizontally in a uniform fashion across the image and not vertically. Therefore, if icon 186 is highlighted, the image 20 will only be stretched uniformly to just fill the screen 15 on the left and right sides. This display sizing mode is called 'wide', but the amount of display sizing is not necessarily the same as the 'wide' mode for icon 166 in FIG. 4, since the incoming format for the image signal in FIG. 4 is 16:9, whereas in FIG. 5 it is 4:3.

Icon 190 includes arrows 192 showing the user that the image signal will be stretched horizontally, not vertically, therefore, just filling the screen 15 on the left and right sides with the image 20. However, unlike icon 186 representing the 'wide' display mode, the image signal is stretched nonuniformly across the image in the horizontal direction. The center portion preserves the aspect ratio of the 4:3 image signal as indicated by the circle 194, and the image is increasingly stretched on the left and right to fill the screen 15 as shown by the ovals 196. This display sizing mode is called 'panorama'. The 'panorama' mode may also slightly trim the top and bottom of image 20 on the screen 15 allowing the image 20 to better match the aspect ratio of the screen 15 thereby minimizing the amount of stretching required from the 'panorama' mode.

Icon 200 includes both horizontal arrows 202 and vertical arrows 204 showing the user that the image signal will be stretched horizontally in a uniform fashion across the image to fill the display, but overstretched vertically to preserve the 4:3 aspect ratio of the image signal as indicated by the vertical arrows 204 extending through the gap 203 and being longer than the horizontal arrows 202. The border of icon 200 represents the border of screen 15 and therefore the vertical arrows 204 extending past the border of icon 200 represents that the image will overfill the screen 15 vertically. This display sizing mode is called 'letterbox', and has a benefit that the image 20 is not distorted as in the 'panoramic' mode. 'Letterbox' is commonly used to remove the top and bottom unused portions of an image signal when a 16:9 aspect ratio image is formatted within a 4:3 aspect ratio image signal, for example in a wide DVD format.

Icon 206 includes vertical arrows 210 and horizontal arrows 208 indicating to the user how the image signal will be processed to present the image 20 to the screen 15 when the icon 206 is highlighted. The vertical arrows 210 and horizontal arrows 208 indicate to the user that the image signal will be uniformly stretched in both the horizontal and vertical directions across the image thereby preserving the 4:3 aspect ratio and accomplishing a zoom-in function. However, the vertical arrows 210 extend past the border (as shown by the gap 209 in the rectangular icon 206) further than the horizontal arrows 208 indicating that more of the top and bottom of the image 20 will overfill the screen 15 than the left and right. The gap 209 occurs on all sides of icon 206. This display sizing mode is called 'zoom', but the amount of display sizing may be somewhat different than the 'zoom' mode for icon 172 in FIG. 4, because the incoming format for the image signal in FIG. 4 is 16:9, whereas in FIG. 5 it is 4:3.

Icon 212 includes horizontal arrows 214 and vertical arrows 216 indicating to the user how the image signal will be processed before the icon 212 is highlighted. These horizontal arrows 214 and vertical arrows 216 are longer and extend past the gap 211 further than the horizontal 208 and vertical 210 arrows that are shown in icon 206 thus signify that the zoom-in function shown in icon 212 is more extreme, and thus has more magnification than the zoom-in function provided by icon 206. The gap 211 occurs on all sides of icon 212. This display sizing mode is called 'zoom 2'.

The icons 184, 186, 190, 200, 206, 212, the highlight box 185, and the 3$^{rd}$ graphical object area 182, will disappear from the image 20 after a short period of inactivity, or can be removed, for example, by pressing the menu (M) button 113 on remote control 102 in FIG. 2 a second time. A button with this removal function could also be added to the remote control 102 in FIG. 2 or implemented on an alternate input devices such as the mouse 118, keyboard 120, or the button 119 in FIG. 2 by one skilled in the art.

Figure 6:
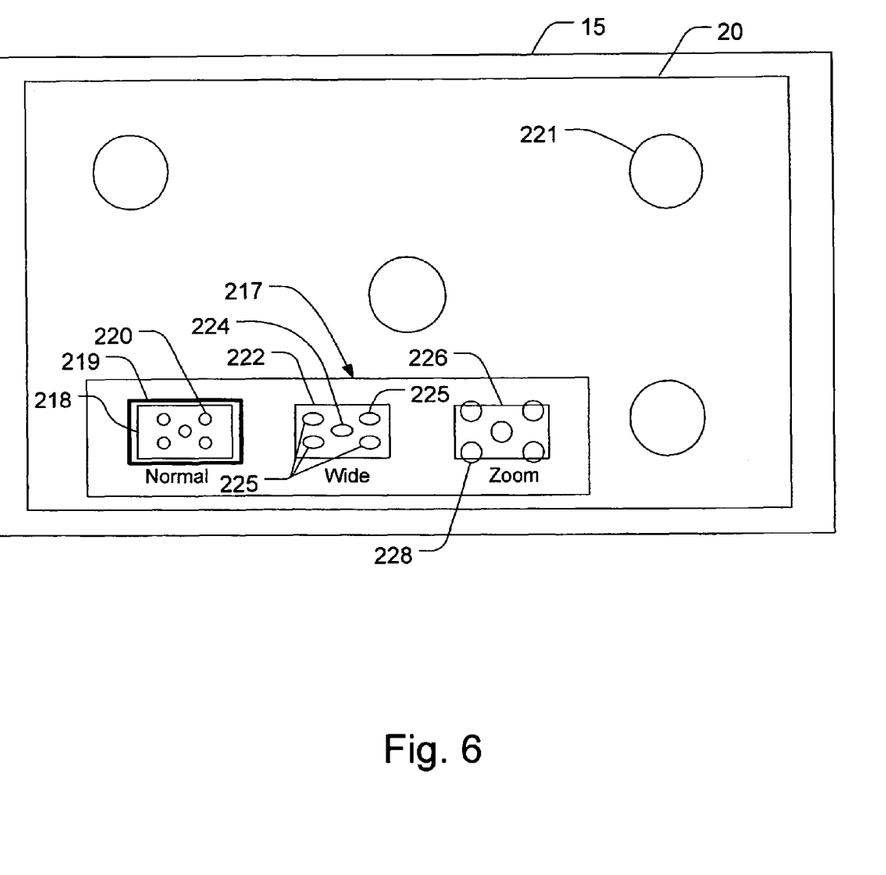
FIG. 6 is an exemplary view of a display screen showing thumbnails assisting the user in properly configuring an image signal to the display when the display has an aspect ratio of 16:9 and the incoming image signal is formatted with an aspect ratio of 16:9 according to one embodiment of this invention.

FIG. 6 shows a 16:9 aspect ratio screen 15 according to an embodiment of the invention. This description is similar to FIG. 4's, however the graphical objects that are icons in FIG. 4. have been replaced by thumbnails in FIG. 6. A thumbnail is a small version of an image 20 and is rendered as graphical object to assist the user in determining and predicting the proper sizing of the image signal to the screen 15. This description of FIG. 6 is for displaying a 16:9 image format signal on a 16:9 aspect ratio screen 15. Displaying a 4:3 image format signal on a 16:9 aspect ratio screen 15 is discussed in reference to FIG. 7. When the menu (M) button 113 on the remote control 102 in FIG. 2 is pressed, a 4th object display area 217 is displayed, and thumbnails 218, 222, and 226 appear. The 4$^{th}$ object display area 217 is an object, and it may take on properties such as color, transparency, shape, animation etc. Each of the thumbnails 218, 222, and 226 are graphically designed to help the user understand how the image will be sized to the display when highlighted. Thumbnails 218, 222, and 226 represent 'normal', 'wide', and 'zoom' respectively. Only these sizing options are displayed and represent a subset of display options, since the controller 136 in FIG. 3 detects, identifies, and decodes the incoming signal, the controller presents only the display options relevant to sizing the 16:9 signal to the 16:9 display. Thumbnails 218, 222 & 226 may be a static snapshot or a constantly updating version of the image 20 displayed on the screen 15.

The navigation buttons 106 and 110 in FIG. 2 allow the user to position a box 219 around one of the thumbnails 218, 222, and 226, by moving box 219 left and right, by pressing button 106 and 110 in FIG. 2 respectively. The purpose of the box 219 shown around thumbnail 218 is to indicate that the thumbnail 218 is highlighted, and this highlighted thumbnail 218 automatically processes the image signal to size the image 20 to the screen in a normal fashion. In this normal situation, the content of the incoming signal is formatted using a 16:9 aspect ratio, and the display screen 15 also has a 16:9 aspect ratio, so the aspect ratio of the image is already matched to the screen 15 and therefore no special processing to re-size the image 20, such as stretching or trimming, is required from the controller 136 of FIG. 3. The perimeter of thumbnail 218 has specifically been designed and rendered to be rectangular in shape to match the 16:9 aspect ratio of the screen 15. Therefore, the rectangular thumbnail 219 provides the user with an indicator of how the image 20 will fit the screen 15 before the image signal is processed and displayed. This display sizing mode is called 'normal'. The circular shape 220 in thumbnail 218 is part of the image content and is included as an illustrative feature in the image showing and further clarifying aspects of this invention by indicating how the image 20 will be sized and displayed. For example, circular shape 220 in thumbnail 218 is a scaled down version of feature 221 present in the image 20. The circles are features in the thumbnail and are not icons 164, 166, 172, 184, 186, 190, 200 206, or 212 as shown in FIG. 4 and FIG. 5.

In a similar manner to thumbnail 218, thumbnail 222 includes ovals 224 and 225 indicating to the user that the circles 220 in thumbnail 218 representing image features have been stretched uniformly in the horizontal direction, but not vertically to form the ovals 224 and 225 in thumbnail 222. Also notice that the ovals 225 are closer to the left and right side of thumbnail 222 contrasted with the circles 220 position to the left and right side of thumbnail 218, further indicating that the image signal will be stretched uniformly across the image in the horizontal direction, and that some of the image on the left and right side will overfill the display. The image signal is not stretched in the vertical direction by comparing the vertical location and height of circle 220 to ovals 224 and 225. This display sizing mode is called 'wide', and occurs when thumbnail 222 is highlighted.

In yet another manner, thumbnail 226 indicates how the image signal will be processed to fill the screen 15 before the thumbnail 226 is highlighted. The circles 228 in thumbnail 226 are larger and spread further apart than the circles 220 of thumbnail 218 representing 'normal', consequently the image signal when highlighting thumbnail 226 will be sized to zoom-in compared to highlighting the normal thumbnail 218. If thumbnail 226 is chosen, some of the image content may extend past the border of the screen 15 both vertically and horizontally. This display sizing mode is appropriately called 'zoom'.

The thumbnails 218, 222 and 226, the highlight box 219 and the 4$^{th}$ graphical object area 217 if used, will disappear from the image 20 after a short period of inactivity by controller 136 in FIG. 3, or they can be removed, for example, by pressing the menu (M) button 113 on remote control 102 in FIG. 2 a second time. A separate button with this function could be added to the remote control 102 in FIG. 2 or could be implemented on alternate input device systems such as the mouse 118, keyboard 120, and the button 119 in FIG. 2. by one skilled in the art.

Figure 7:
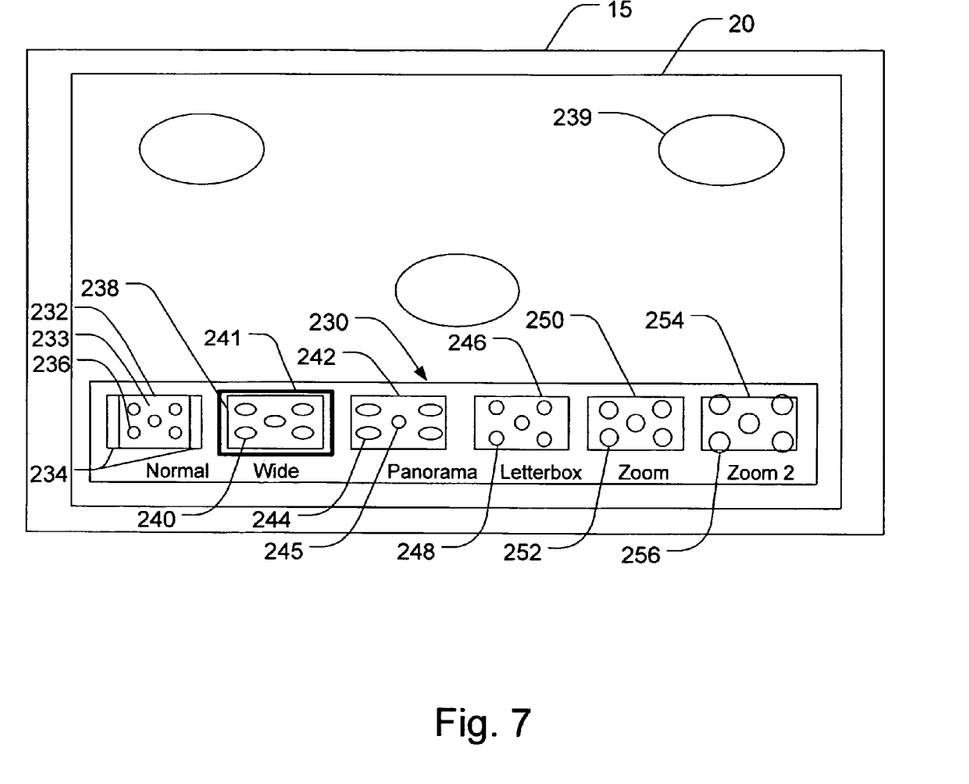
FIG. 7 is an exemplary view of a display screen showing thumbnails assisting the user in properly configuring an image signal to the display when the display has an aspect ratio of 16:9 and the incoming image signal is formatted with an aspect ratio of 4:3 according to one embodiment of this invention.

FIG. 7 shows a 16:9 aspect ratio screen 15 according to an embodiment of the invention. The description of FIG. 7 is similar to the description of FIG. 5, however the graphical objects that are icons in FIG. 5. have been replaced by thumbnails 232, 238, 242, 246, 250, and 254 in FIG. 7. The description of FIG. 7 is when a 4:3 aspect ratio image signal is displayed on a 16:9 aspect ratio screen 15. Displaying a 16:9 image format signal on a 16:9 aspect ratio screen 15 is discussed in reference to FIG. 6. When the menu (M) button 113 on the remote control 102 in FIG. 2 is pressed, a 5th object display area 230 is displayed, and thumbnails 232, 238, 242, 246, 250, and 254 appear. Since the 5$^{th}$ object display area 230 is also rendered as an object, it may take on object like properties such as color, transparency, shape, animation etc. Each of the thumbnails 232, 238, 242, 246, 250, and 254 are graphically designed and rendered to help the user understand and predict how the image 20 will be sized to the display 15 if activated. Thumbnails 232, 238, 242, 246, 250, and 254 represent 'normal', 'wide', 'panorama', 'letterbox', 'zoom', and 'zoom 2' modes respectively. Only these sizing options are displayed and actually represent a subset of all available display options. Since the controller 136 in FIG. 3 detects, identifies, and decodes the incoming image signal, only the display options relevant to sizing the 4:3 signal to the 16:9 display are presented. Thumbnails 232, 238, 242, 246, 250, and 254 may be a static snapshot or a constantly updating version of the image 20 displayed on the screen 15.

The navigation buttons 106 and 110 on the remote control 102 in FIG. 2 allow the user to position a box 241 around one of the thumbnails 232, 238, 242, 246, 250, and 254, by moving the box 241 left and right, by pressing button 106 and 110 in FIG. 2 respectively. The box 241 around a thumbnail 238 represents it has been highlighted, and the controller 136 in FIG. 3 automatically processes the image signal according to the activated thumbnail 238, which in this case is 'wide', causing the 4:3 image signal to be stretched horizontally to fill the screen 15.

In thumbnail 232 (the 'normal' sizing mode) the content of the incoming image signal is formatted using a 4:3 aspect ratio, yet the display screen 15 has a 16:9 aspect ratio, Thus the image 20 cannot fully fill the screen 15 without processing the image signal to resize the image. The 'normal' display mode does not stretch, distort, or resize the image signal; rather, the unaltered 4:3 aspect ratio image signal is presented completely within the boundary of the 16:9 aspect ratio perimeter as shown in thumbnail 232. Therefore, the 'normal' display mode as represented by thumbnail 232 excludes the areas 234, where no image signal is displayed. The circles 236 represent features in the thumbnail 232 and are not icons. This display sizing mode is called 'normal'.

In thumbnail 238, the incoming image signal formatted in a 4:3 aspect ratio is stretched uniformly across the image in the horizontal direction to fill the display 15. The thumbnail 238 is shown highlighted by box 241, and the features in the thumbnail 238 are distorted as shown by the oval 240 which also matches the oval feature 239 in the image 20. This display sizing mode is called 'wide'.

In thumbnail 242, the incoming image signal formatted in a 4:3 aspect ratio is stretched nonuniformly across the image in the horizontal direction. This mode of display is called 'panorama' and a feature represented by a circle 245 which is horizontally centered will not be substantially stretched in the horizontal direction, while a feature which is not horizontally centered is substantially stretched in the horizontal direction as shown by an oval 244. In other words, 'panorama' renders the center of the image 20 undistorted while filling the screen 15 horizontally with a progressively stretched and thereby distorted image 20 near the left and right sides of the screen 15. The 'panorama' mode may slightly trim the top and bottom of image 20 on the screen 15 allowing the image 20 to better match the aspect ratio of the screen 15 thereby minimizing the amount of stretching required from the 'panorama' mode.

In thumbnail 246, the incoming image signal formatted in a 4:3 aspect ratio is zoomed in order to horizontally fill the display 15. This display sizing mode is called 'letterbox', and a feature represented by a circle 248 is larger than the feature represented by a circle 236 shown in the normal thumbnail 232, but not distorted like the features 240 and 244 in thumbnails 238 and 242 respectively. Highlighting thumbnail 246 causes the top and bottom of the image 20, to overfill the display 15 and this information is not displayed. 'Letterbox' is commonly used to remove the top and bottom unused portions of an image signal when a 16:9 aspect ratio image is formatted within a 4:3 aspect ratio image signal—a typical DVD movie format.

In thumbnails 250 and 254, the incoming image signal overfills both vertically and horizontally, but to a different degree. These display sizing modes are called 'zoom' and 'zoom 2' respectively, and features 252 and 256 are enlarged over the feature 236 shown in the normal thumbnail 232, but not distorted in aspect ratio like features 240 and 244 in thumbnails 238 and 242 respectively.

The thumbnails 232, 238, 242, 246, 250, 254, the highlight box 241, and the 5$^{th}$ graphical object area 230, if used, will disappear from the image 20 after a short period of inactivity by controller 136 in FIG. 3, or they can be removed, for example by depressing the menu (M) button 113 on remote control 102 in FIG. 2 a second time. A button with this function could also be added to the remote control 102 in FIG. 2 or this function could be implemented on alternate input devices such as the mouse 118, keyboard 120, or the button 119 on display 10 in FIG. 2 by one skilled in the art.

Figure 8:
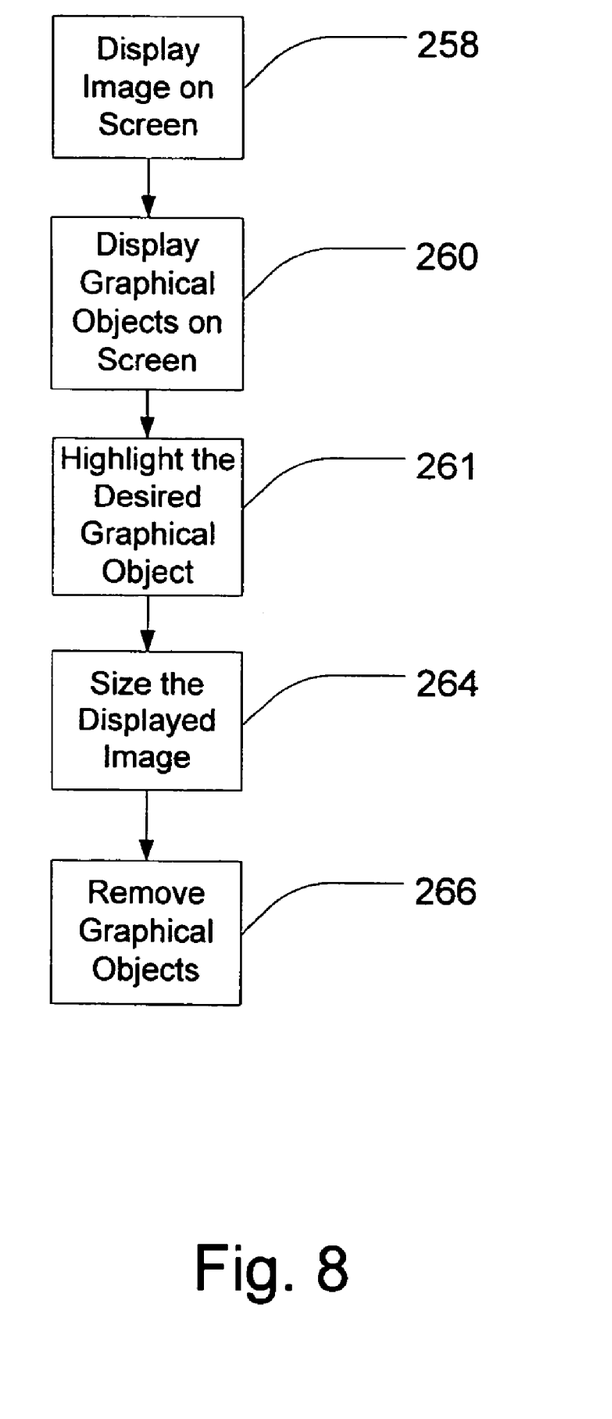
FIG. 8 is an exemplary flow chart showing the steps a user takes interacting with a display configuring system according to one embodiment of this invention.

FIG. 8 shows steps that the user takes in properly sizing an image to the screen. In the first step 258, the user displays an image on the screen. Displaying the image is normally done by powering on the display 10 in FIG. 2, selecting a channel, in the case of a television, or in the case of a computer based display, selecting an image or a video sequence, and viewing the image 20 on the screen 15 in FIG. 2. The image can be a uniform color, such as a blue screen etc.

In the second step 260, the user displays graphical objects. As an example, graphical objects 124, 126, 128, 130, 132, 134, 121 and the 1st graphical object area 122 are shown in FIG. 2 and are displayed on the screen 15 by pressing the menu (M) button 113 on the remote control 102, or alternately selecting the menu by input devices such as, but not limited to, a mouse 118, a keyboard, 120, a button on the display 10 as shown in FIG. 2. The controller 136 in FIG. 3, also positions the highlighting box 121 in FIG. 2 around the graphical object which is currently associated with the presently displayed image 20 in FIG. 2. For example, as shown in FIG. 2, if the image 20 is presented in 'normal' mode, then the 'normal' icon 124 is highlighted by box 121 in FIG. 2 by the controller 136 in FIG. 3.

In the third step 261, the user selects to highlight the desired graphical object. If the user desires to change the sizing of the image 20 on the screen 15 in FIG. 2, then another graphical object for example 126, 128, 130, 132, or 134 can be highlighted as shown in FIG. 2. Highlighting is accomplished by pressing buttons 106 or 110 on the remote control 102 or alternately by using input devices such as, but not limited to, a mouse 118, a keyboard, 120, a button 119 on the display 10 in FIG. 2 or other techniques.

In the forth step 264, the controller 136 in FIG. 3 may size the image 20 to the screen 15 in FIG. 2 once the highlighted object has been selected by the user. This selection occurs when the controller accepts a command from the input device, such as a remote control 102 in FIG. 2. The image sizing can be accomplished by a digital signal processor, but other processors, such as microcontrollers, etc. can also be used. Highlighting a graphical object and automatically processing the image is called auto-activation. Manual activation is when the user is prompted to confirm that the selected graphical object is correct before sizing the image 20 to the screen 15 in FIG. 2.

In the fifth step 266, the graphical objects 121, 122, 124, 126, 128, 130, 132, and 134 are removed from the displayed image 20 in FIG. 2 either after a short period of time by the controller 136 in FIG. 3 removing these objects automatically, or they can also be removed immediately by pressing the menu (M) button 113 on remote control 102 in FIG. 2 a second time to toggle them off. These objects can also be removed by using of another input device such as a mouse 118, a keyboard 120, or a button 119 on a display 10 as shown in FIG. 2 or by other techniques.

It should now be apparent that the image sizing selection processes described in this invention and further described in reference to FIGS. 4, 5, 6, 7, and 8 provide the user with a far more intuitive, efficient, and less frustrating experience for sizing image signals to a display. Although in the embodiments described the image sizing occurs immediately once a graphical object is highlighted, this is a design choice, and it is also understood that other design choices could be used. For example, the user could be prompted to confirm that the selected graphical object is correct before sizing the image on the display. It should also be appreciated that there are a great number of varieties of image signal formats available, and this invention describes elegant and useful ways for the user to properly configure the image signal to the display, regardless of the incoming image signal aspect ratio relative to the display. This invention has been demonstrated using examples of image signals having aspect ratios of 4:3 and 16:9, however it should be understood that this invention is not restricted nor limited to processing image signals with these aspect ratios, for example image signal formats with aspect ratios of 2.35:1 which are fairly common, could be used. Likewise, the invention is not limited to displaying images only on a screen with a 16:9 aspect ratio; for example, another commonly available display aspect ratio is 4:3 for which this invention applies.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for sizing an image on a display, comprising:
providing a mechanism to display the image on a screen on the display;
providing a processing device to simultaneously display a set of graphical objects on the screen, the set of graphical objects representing available display options for the image, and each graphical object rendered as a non-textual object providing a different indication of how the image would be sized for display on the screen if a respective graphical object from the set of graphical objects is activated by an activation event;
allowing the processing device to size the image for display on the screen based on the activated graphical object; and
determining the set of graphical objects based on detecting a format of an image signal and an aspect ratio of the display.

2. The method of claim 1, wherein allowing the processing device to size the image includes nonuniformly sizing the image.

3. The method of claim 1, wherein providing a processing device to simultaneously display a set of graphical objects on the screen includes allowing the highlight of one of the graphical objects.

4. The method of claim 1, wherein providing a processing device to simultaneously display a set of graphical objects on the screen includes allowing a rendering of the graphical object as a thumbnail of the image.

5. The method of claim 1, wherein providing a processing device to simultaneously display a set of graphical objects on the screen includes allowing a rendering of the graphical object as an icon predictive of the sizing if activated.

6. The method of claim 1, further comprising providing an input device to activate the graphical object.

7. The method of claim 1, wherein providing a mechanism to display the image on a screen and providing a processing device to simultaneously display a set of graphical objects on the screen provides the display of the image on the screen with the simultaneous display of the set of graphical objects on the screen.

8. The method of claim 1, wherein providing a processing device to simultaneously display a set of graphical objects on the screen provides simultaneous display of more than one of a normal display option, a wide display option, a zoom display option, a panorama display option, and a letterbox display option for the image on the screen.

9. A method for sizing an image on a display, comprising:
displaying the image on a screen on the display;

simultaneously displaying a set of graphical objects on the screen, each graphical object rendered as a non-textual object, and the set of graphical objects representing available sizing options for display of the image on the screen;

activating one graphical object from the set of graphical objects;

sizing the image for display on the screen based on the activated graphical object; and determining the set of graphical objects based on detecting a format of an image signal and an aspect ratio of the display.

10. The method of claim 9, wherein sizing the image based on the activated graphical object includes nonuniformly sizing the image.

11. The method of claim 9, wherein simultaneously displaying a set of graphical objects on the screen includes highlighting one of the graphical objects.

12. The method of claim 9, wherein simultaneously displaying a set of graphical objects on the screen includes rendering a graphical object as a thumbnail of the image.

13. The method of claim 9, wherein simultaneously displaying a set of graphical objects on the screen includes rendering a graphical object as an icon predictive of the sizing if activated.

14. The method of claim 9, wherein activating one graphical object from the set of graphical objects includes activating the graphical object by an input device.

15. The method of claim 9, wherein displaying the image on a screen and simultaneously displaying a set of graphical objects on the screen includes displaying the image on the screen with the simultaneously displaying the set of graphical objects on the screen.

16. The method of claim 9, wherein simultaneously displaying a set of graphical objects on the screen includes simultaneously displaying more than one of a normal sizing option, a wide sizing option, a zoom sizing option, a panorama sizing option, and a letterbox sizing option for the image on the screen.

17. A display, comprising:
a processor;
a screen displaying an image and a set of graphical objects, the set of graphical objects representing available display options for the image, and each graphical object rendered as a non-textual object providing a different indication of how the image would be sized for display on the screen if activated; and
a memory having instructions readable by the processor to cause the processor to perform acts of:
displaying the image on the screen;
simultaneously displaying the set of graphical objects on the screen;
activating one of the graphical objects; and
sizing the image for display on the screen based on the activated graphical object,
wherein the display of the set of graphical objects on the screen is determined based on a detected format of an image signal and a format of the display.

18. The display of claim 17, wherein the set of graphical objects are arranged in an object area.

19. The display of claim 17, further comprising an input device wherein the processor accepts inputs from the input device.

20. The display of claim 17, wherein one of the set of graphical objects is highlighted.

21. The display of claim 17, wherein the displayed image is nonuniformly sized.

22. The display of claim 17, wherein one or more of the set of graphical objects is a thumbnail of the image.

23. The display of claim 17, wherein one or more of the set of graphical objects is an icon predictive of the sizing if activated.

24. The display of claim 17, wherein displaying the image on the screen and simultaneously displaying the set of graphical objects on the screen includes displaying the image on the screen with the simultaneously displaying the set of graphical objects on the screen.

25. The display of claim 17, wherein simultaneously displaying the set of graphical objects on the screen includes simultaneously displaying more than one of a normal display option, a wide display option, a zoom display option, a panorama display option, and a letterbox display option for the image on the screen.

26. A display, comprising:
means for simultaneously displaying a set of graphical objects on the display, the set of graphical objects representing available display options for an image, and each graphical object rendered as a non-textual object providing a different indication of how the image will be sized for display on a screen of the display if activated;
means for selecting one of the graphical objects, and
means for sizing the image for display on the screen of the display based on the selected graphical object,
wherein the means for simultaneously displaying a set of graphical objects on the display is based on means for detecting a format of an image signal and an aspect ratio of the display.

27. The display of claim 26, wherein the means for simultaneously displaying a set of graphical objects on the display includes means for highlighting one of the graphical objects.

28. The display of claim 26, wherein the means for selecting one of the graphical objects includes means for receiving a command from an input device.

29. The display of claim 26, wherein the means for sizing the image based on the selected graphical object includes means for nonuniformly sizing the image.

30. The display of claim 26, wherein the means for simultaneously displaying a set of graphical objects on the display includes means for rendering at least one of the graphical objects as a thumbnail of the image.

31. The display of claim 26, wherein the means for simultaneously displaying a set of graphical objects on the display includes means for rendering at least one of the graphical objects as an icon predictive of the sizing if activated.

32. The display of claim 26, wherein means for simultaneously displaying a set of graphical objects on the display includes means for displaying the image on the display with the simultaneously displaying the set of graphical objects on the display.

33. The display of claim 26, wherein means for simultaneously displaying a set of graphical objects on the display includes means for simultaneously displaying more than one of a normal display option, a wide display option, a zoom display option, a panorama display option, and a letterbox display option for the image on the display.

* * * * *